United States Patent

Toki et al.

Patent Number: 5,723,224
Date of Patent: Mar. 3, 1998

[54] PHOSPHORESCENT MATERIAL

[75] Inventors: Hitoshi Toki; Yoshihisa Yonezawa; Yoshitaka Kagawa, all of Mobara, Japan

[73] Assignee: Futaba Denshi Kogyo K.K., Chiba-ken, Japan

[21] Appl. No.: 631,050

[22] Filed: Apr. 12, 1996

[30] Foreign Application Priority Data

Apr. 12, 1995 [JP] Japan .................. 7-087115

[51] Int. Cl.$^6$ .................. C09K 11/08
[52] U.S. Cl. .................. 428/570; 428/629; 428/639; 252/301.4 R
[58] Field of Search .................. 428/570, 629, 428/639; 252/301.4 R

[56] References Cited

U.S. PATENT DOCUMENTS

| | | |
|---|---|---|
| 4,691,140 | 9/1987 | Sakakibara et al. .................. 313/486 |
| 5,336,080 | 8/1994 | Sumitomo et al. .................. 428/407 |
| 5,619,098 | 4/1997 | Toki et al. .................. 313/496 |

*Primary Examiner*—Charles Nold
*Attorney, Agent, or Firm*—Breiner & Breiner

[57] ABSTRACT

A phosphorescent material has an excellent life time characteristic when it is applied to display device such as a fluorescent display device and includes a body portion composed of alkali metal and an oxide, and a protective coat formed over a surface of the body portion. The protective coat is composed of an oxide containing at least one element selected from the group consisting of Al, Ti, Si, Zn, Sn, Bi, Sb, Ce, Y, Ta, Gd, Ru and Ga.

7 Claims, 1 Drawing Sheet

PHOSPHORESCENT MATERIAL

BACKGROUND OF THE INVENTION

1. Field of the Invention

This invention relates to a phosphorescent material including a body portion composed of alkali earth metal and an oxide, and more particularly to a phosphorescent material capable of emitting light when electrons collide thereagainst, which is suitably used as an anode of a fluorescent display device to thereby provide the device having a sufficient life time.

2. Discussion of the Background

The present applicant has proposed, in the previously filed Japanese patent application No. 6-248,589 (1994), a phosphorescent material including a body portion composed of alkali earth metal and titanium oxide to which rare earth elements and elements belonging to III group of the Periodic Table are further added. Such a phosphorescent material has, for example, a composition of $SrTiO_3$:Pr.Al. The body portion of the phosphorescent material having the aforementioned composition exhibits an energy gap Eg of 3.3 eV. This indicates that the body portion of the phosphorescent material has a low electrical resistance and therefore can emit light even when a low voltage is applied thereto.

However, in the case where the phosphorescent material is applied as an anode of a fluorescent display device and subjected to a life time test to evaluate its luminescent characteristic, it has been recognized that deterioration in the luminance is observed only after several ten hours. In addition, at this time, a surface of the phosphorescent material is turned black. When the phosphorescent material is analyzed with respect to its surface condition, it has been revealed that the coloration is due to the increase in amount of carbon deposited on the surface of the phosphorescent material. However, when the similar phosphorescent material is placed in a demountable device and evaluated as to its life time, the afore mentioned deterioration in luminance is unlikely to occur.

Furthermore, even if a Sr/Ti ratio and amounts of Al and Pr of the phosphorescent material are changed, no improvement in its life time can be achieved. Similarly, even if powders such as $In_2O_3$, $WO_3$ or the like are added to the phosphorescent material, no essential improvement in life time of the phosphorescent material can be achieved.

It is suggested by the present inventors that the deterioration in luminance of the phosphorescent material observed when it is applied to the fluorescent display device, would be caused at least by deposition of a residual gas present in an evacuated container of the fluorescent display device over the surface of the phosphorescent material.

The present inventors have further recognized that such an adverse phenomenon is caused in different manners depending upon materials used in the phosphorescent material. Especially, when the material used for the phosphorescent material is active to carbon-based residual gases such as $CO$, $CO_2$ or $CH_4$ in the evacuated container, or a water content, the adverse phenomenon is more remarkably observed. In the event that a phosphorescent oxide containing alkali earth metal is used, there exists a chemical bond such as, for example, Sr—O or Ba—O on the surface of the phosphorescent material. Therefore, since such a chemical bond is especially sensitive to the carbon-based gases, it is considered that the reaction of $SrO+CO_2 \rightleftarrows SrCO_3$ is caused even at normal temperature.

In consequence, the present inventors have suggested that it will be effective that a partial pressure of the carbon-based gases in the evacuated container is limited to $10^{-6}$ Pa or lower when the phosphorescent material contains alkali earth metal. However, for instance, in the case of the fluorescent display device, since a cathode filament made of carbonate is used therein, it is difficult to reduce the partial pressure of the carbon-based gases in the evacuated container. Moreover, since a vacuum degree corresponding to such a partial pressure of $10^{-6}$ Pa or lower is fallen within a so-called high vacuum range, a mass production of the fluorescent display device having such a high vacuum degree can be performed only with increase in a manufacturing cost thereof.

SUMMARY OF THE INVENTION

The present invention has been made to overcome the aforementioned problems encountered in the prior art.

It is therefore an object of the present invention to provide a phosphorescent material having a body portion composed of alkali earth metal and an oxide and exhibiting a life time sufficient to bear a practical use even when applied, for example, to an anode of a fluorescent display device.

In accordance with the present invention, there is provided a phosphorescent material including a body portion composed of an alkali earth metal and an oxide, and a protective coat formed over an outer surface of the body portion.

In a preferred form of the phosphorescent material according to the present invention, the protective coat is made of an oxide containing, as a primary component, at least one element selected from the group consisting of Al, Ti, Si, Ga, Zn, Sn, Bi, Sb, Ce, Y, Ta, Gd, Ru and Ga.

In a further preferred form of the phosphorescent material according to the present invention, the amount of the protective coat formed is in the range of 50 mg to 10,000 mg based on one kilogram of the phosphorescent material.

In a still further preferred form of the phosphorescent material according to the present invention, the alkali earth metal is at least one element selected from the group consisting of Mg, Sr, Ca and Ba.

In a still further preferred form of the phosphorescent material according to the present invention, the oxide constituting the body portion is titanium oxide.

In a still further preferred form of the phosphorescent material according to the present invention, the body portion further contains an element belonging to III group of the Periodic Table.

In a still further preferred form of the phosphorescent material according to the present invention, the element belonging to III group of the Periodic Table is selected from the group consisting of Ce, Pr, Eu, Tb, Er and Tm in rare earth elements, and Al, Ga, In and Tl belonging to IIIb group of the Periodic Table.

The protective coat formed over the surface of the phosphorescent material serves to protect the body portion of the phosphorescent material, for example, from the carbon-based gases present in the evacuated container of the fluorescent display device. As a result, even in the case where the partial pressure of the carbon-based gases in the evacuated container is higher than $10^{-6}$ Pa, the phosphorescent material can be well excited by radiation of an electron beam so that light with a sufficient luminance is emitted therefrom. This ensures a stable operation of the device to which the phosphorescent material is applied.

BRIEF DESCRIPTION OF THE DRAWINGS

These and other objects and many of the attendant advantages of the present invention will be readily appreciated as the same becomes better understood by reference to the following detailed description when considered in connection with the accompanying drawing; wherein.

DETAILED DESCRIPTION OF THE INVENTION

The present invention is described in more detail below by way of examples by referring to the accompanying drawings. Each of phosphorescent materials prepared in the respective examples includes a body portion composed of alkali earth metal and titanium oxide to which elements belonging to III group (rare earth elements and/or IIIb group elements) of the Periodic Table are added. A surface of the phosphorescent body portion or a surface of a film made of the phosphorescent substance is covered with a protective coat made of a material exhibiting a heat-stability in device-manufacturing processes, no reactivity with the phosphorescent body portion and a transparency to light emitted from the phosphorescent body portion.

Meanwhile, examples of the afore mentioned alkali earth metals may include Mg, Sr, Ca and Ba. Examples of the aforementioned elements belonging to the III group of the Periodic Table may include rare earth elements such as Ce, Pr, Eu, Tb, Er or Tm, and elements belonging to the IIIb group of the Periodic Table such as Al, Ga, In or Tl. The afore mentioned protective coat is made of an oxide containing at least one element selected from the group consisting of Al, Ti, Si, Zn, Sn, Bi, Sb, Ce, Y, Ta, Gd, Ru and Ga.

EXAMPLE 1 AND COMPARATIVE EXAMPLE 1

$SrTiO_3$ as a body portion of a phosphorescent material was activated by adding praseodymium thereto in an amount of 0.002 mole based on one mole of $SrTiO_3$. Further added to the activated body portion was 0.5 mole of Al per one mole of $SrTiO_3$ to obtain a phosphorescent body portion having a composition of $SrTiO_3$:Pr,Al in the form of particles. The thus-prepared phosphorescent body portion was immersed in a solution containing a given amount of bismuth nitrate in acetone. Acetone was evaporated from the solution so that a bismuth nitrate film was formed over a surface of each particle of the afore mentioned phosphorescent body portion. The particulate phosphorescent body portion was filled in an alumina container and sintered at a temperature ranging from 500° C. to 700° C. so that the bismuth nitrate was converted to bismuth oxide ($Bi_2O_3$) to thereby prepare a phosphorescent material according to the present invention.

The conversion rate of bismuth nitrate to bismuth oxide was in the range of 10 mg/kg to 40,000 mg/kg in terms of bismuth oxide. The thus-prepared phosphorescent material was actually mounted to a fluorescent display device to evaluate its characteristics. The fluorescent display device was operated under such a lighting condition that an average electrical current was 0.2 mA/cm² when an anode voltage of 200 V was applied.

Meanwhile, a phosphorescent material of Comparative Example 1 was prepared without subjecting the phosphorescent body portion to the afore mentioned surface treatment, namely without treating the phosphorescent body portion composed of $SrTiO_3$:Pr,Al with bismuth nitrate (the amount of the protective coat adhered: 0 mg/kg).

Figure 1A:
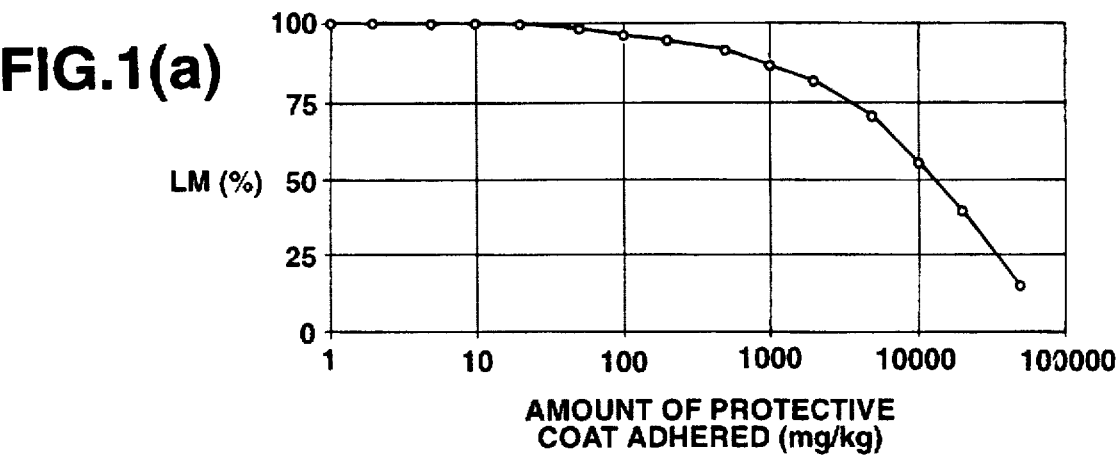
FIG. 1(a) is a graph showing a relation between an amount of a protective coat adhered on a surface of a phosphorescent body portion and an initial luminance LM (%) of a phosphorescent material.
Figure 1B:
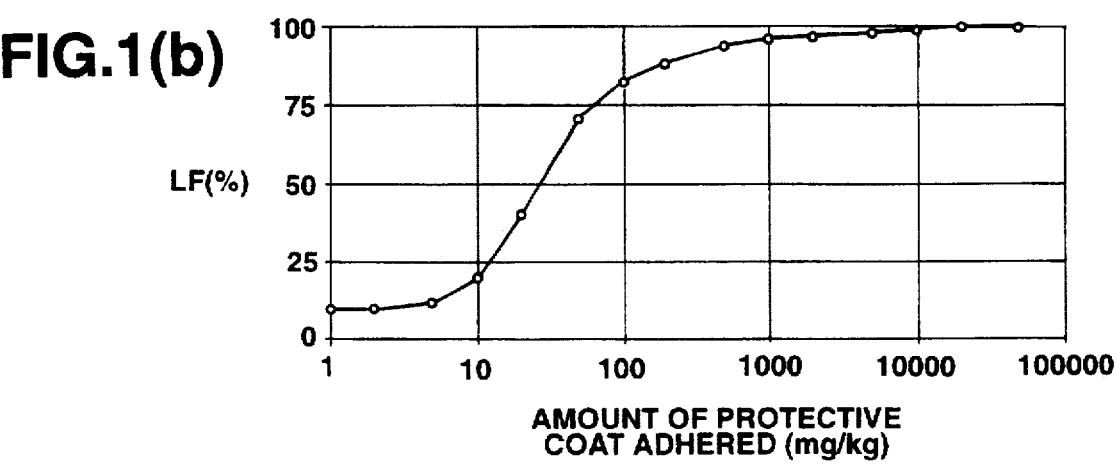
FIG. 1(b) is a graph showing a relation between an amount of a protective coat adhered on a surface of a phosphorescent body portion, and a life time LF (%) of a phosphorescent material.

FIG. 1(a) is a graph showing a relation between an amount of the protective coat adhered on a surface of the phosphorescent body portion and an initial luminance LM (%) of the phosphorescent material when it is assumed that an initial luminance of the phosphorescent material prepared in Comparative Example 1 without any surface treatment is regarded as 100%. As is clearly appreciated from FIG. 1(a), the initial luminance was decreased as the amount of the protective coat adhered was increased. In addition, FIG. 1(b) is a graph showing a relation between the amount of the protective coat adhered on a surface of the phosphorescent body portion, and a life time LF (%) of the phosphorescent material. As understood from FIG. 1(b), it was recognized that improvement in life time characteristic of the phosphorescent material was observed when the amount of the protective coat adhered was about 50 mg/kg or higher.

The phosphorescent material of the present Example was measured with respect to a thickness of a bismuth oxide ($Bi_2O_3$) layer by using a TEM (transverse-electromagnetic) wave. As a result, when the amount of the protective coat adhered was 200 mg/kg, it was confirmed that the protective coat having a thickness of about 3 Å to about 7 Å was uniformly formed on the surface of the phosphorescent body portion. In general, when an accelerating voltage is 1 kV or lower, an electron beam penetrates the phosphorescent material and reaches its depth of at most several ten angstroms. In consequence, when the amount of the protective coat adhered on a surface of the phosphorescent body portion is 20,000 mg/kg, the thickness of the bismuth oxide ($Bi_2O_3$) layer reaches about 300 Å to about 700 Å. With such a large thickness of the protective coat, it is difficult for the phosphorescent material to emit light, as is shown in FIG. 1(a).

From this fact, it is preferred that the amount of the protective coat adhered on a surface of the phosphorescent body portion be in the range of 50 mg/kg to 10,000 mg/kg, because a luminance of 50% or higher can be obtained in such a range. Moreover, it is more preferred that the amount of the protective coat adhered is in the range of 50 mg/kg to 2.000 mg/kg, because a luminance of 80% or higher can be obtained in such a range.

Figure 1C:
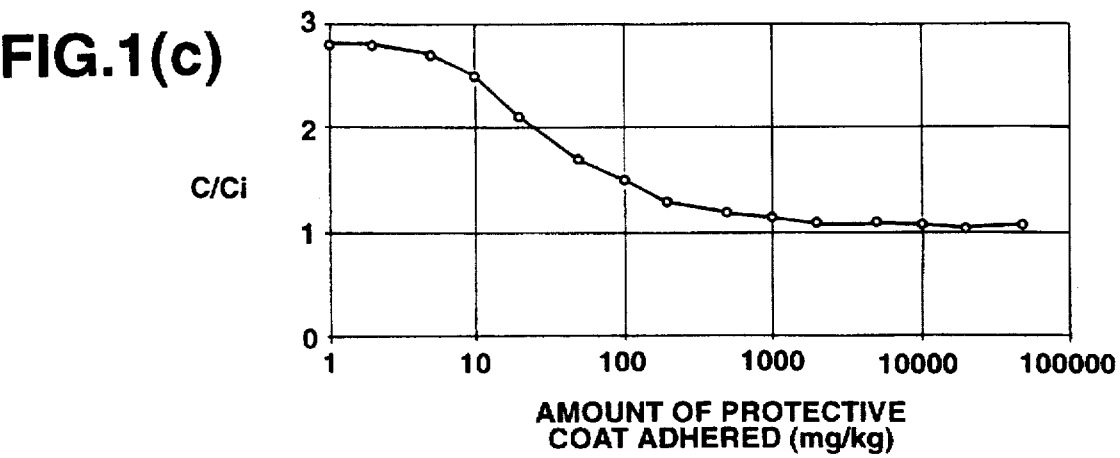
FIG. 1(c) is a graph showing a relation between a ratio of an initial amount of carbon deposited on a surface of a phosphorescent body portion, which is measured before a life time test, to an amount of carbon deposited, which is measured after the life time test, and an amount of a protective coat adhered on the surface of the phosphorescent body portion.

The phosphorescent material of the present invention was further subjected to the surface analysis after the afore mentioned life time test. FIG. 1(c) is a graph showing a relation between a ratio of an initial amount of carbon deposited on the surface of the phosphorescent body portion, which was measured before the life time test, to an amount of carbon deposited, which was measured after the life time test, and the amount of the protective coat adhered on the surface of the phosphorescent body portion. As is appreciated from FIG. 1(c), the amount of carbon deposited of Comparative Example 1 was about three times the initial one. On the other hand, it was confirmed that the phosphorescent material of the present Example showed less increase in the amount of carbon deposited.

EXAMPLE 2

The procedure of Example 1 was repeated in the same manner as described above except that organic titanium diluted with ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $TiO_2$.

EXAMPLE 3

The procedure of Example 1 was repeated in the same manner as described above except that aluminum nitrate dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $Al_2O_3$.

EXAMPLE 4

The procedure of Example 2 was repeated in the same manner as described above except that organic silicon (Si) was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $SiO_2$.

EXAMPLE 5

The procedure of Example 1 was repeated in the same manner as described above except that zinc nitrate dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of ZnO.

EXAMPLE 6

The procedure of Example 1 was repeated in the same manner as described above except that indium nitrate dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $In_2O_3$.

EXAMPLE 7

The procedure of Example 1 was repeated in the same manner as described above except that tin chloride dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $SnO_2$.

EXAMPLE 8

The procedure of Example 1 was repeated in the same manner as described above except that cerium nitrate dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $CeO_2$.

EXAMPLE 9

The procedure of Example 1 was repeated in the same manner as described above except that yttrium was selected as a typical example of rare earth elements and yttrium nitrate dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $Y_2O_3$.

EXAMPLE 10

The procedure of Example 1 was repeated in the same manner as described above except that ruthenium nitrate dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $RuO_4$.

EXAMPLE 11

The procedure of Example 1 was repeated in the same manner as described above except that gallium nitrate dissolved in ethanol was used as a material for the protective coat. Evaluation of characteristics of the thus-prepared phosphorescent material was performed under such a condition that the amount of the protective coat adhered on a surface of the phosphorescent body portion was 200 mg/kg when measured in terms of $Ga_2O_3$.

The results of Examples 1 to 11 and Comparative Example 1 are shown in Table 1. In Table 1, the initial luminance (%) of each Example was measured as a relative luminance obtained when the initial luminance of the phosphorescent material prepared in Comparative Example 1 is regarded as 100%. Furthermore, a residual luminance (%) was measured after 500 hour life time test.

TABLE 1

| Example No. | Protective Coat | Initial Luminance (%) | Residual Luminance after 500 hour Life Time Test (%) |
| --- | --- | --- | --- |
| 1 | $Bi_2O_3$ | 85 | 99 |
| 2 | $TiO_2$ | 97 | 90 |
| 3 | $Al_2O_3$ | 95 | 85 |
| 4 | $SiO_2$ | 99 | 75 |
| 5 | ZnO | 75 | 95 |
| 6 | $In_2O_3$ | 87 | 92 |
| 7 | $SnO_2$ | 90 | 84 |
| 8 | $Ce_2O_3$ | 80 | 93 |
| 9 | $Y_2O_3$ | 78 | 72 |
| 10 | $RuO_4$ | 73 | 94 |
| 11 | $Ga_2O_3$ | 71 | 89 |
| Comparative Example 1 | None | 100 | 10 |

As described above, it was confirmed that, when an adequate amount of the protective coat was adhered on the surface of the phosphorescent body portion, the resulting phosphorescent material was improved in its life time without being adversely affected by the deposition of carbon. Moreover, it was also confirmed that, as a result of an X-ray diffraction analysis, the protective coat was present substantially in the form of an oxide, as shown in Table 1.

Meanwhile, elements other than Al, such as Ga or In, can be also added to the composite material $SrTiO_3$:Pr of the phosphorescent body portion to improve the initial luminescent characteristic. In this case, the same result can be obtained by treating these phosphorescent body portions in the same manner as described in each Example.

EXAMPLES 12–17 AND COMPARATIVE EXAMPLE 2

$GaTiO_3$:Pr was used as a phosphorescent body portion and provided with respective protective coats as shown in Table 2 to obtain phosphorescent materials of Examples 12 to 17 except for that of Comparative Example 2. Thus, the phosphorescent body portion without any protective coat was used as a phosphorescent material of Comparative Example 2. These phosphorescent materials were subjected to a life time test in the same manner as described in Examples 1 to 11 to measure initial luminances and residual luminances thereof. The results are also shown in Table 2. Incidentally, the formation of the protective coat composed of $Ta_2O_5$ was carried out in the same manner as in the other Examples.

TABLE 2

| Example No. | Protective Coat | Initial Luminance (%) | Residual Luminance after 500 hour Life Time Test (%) |
| --- | --- | --- | --- |
| 12 | $Al_2O_3$ | 95 | 88 |
| 13 | $SiO_2$ | 97 | 72 |
| 14 | $Ta_2O_5$ | 92 | 96 |
| 15 | ZnO | 85 | 97 |
| 16 | $Gd_2O_3$ | 90 | 82 |
| 17 | $RuO_4$ | 86 | 91 |
| Comparative Example 2 | None | 100 | 12 |

As understood from the above, it was confirmed that the life time characteristics of the phosphorescent materials were improved by providing the protective coat on the surface of the phosphorescent body portion. In addition, the same results as above could be obtained even when the phosphorescent body portion was composed of other materials, e.g., (Sr, Ca)$TiO_3$:Pr.

EXAMPLE 18

$SrTiO_3$ as a body portion of a phosphorescent material was activated by adding Pr thereto in an amount of 0.002 mole based on one mole of $SrTiO_3$. Further added to the activated body portion was 0.5 mole of Al per one mole of $SrTiO_3$ to obtain a phosphorescent body portion composed of $SrTiO_3$:Pr,Al. The thus-prepared phosphorescent body portion was dispersed in a vehicle containing a cellulose-based binder to obtain a paste. The paste was coated over an anode substrate with an ITO electrode by using a screen printing method so that a phosphor layer as a phosphorescent material of the present invention was formed on the anode substrate. After removal of the binder, a solution prepared by dissolving or diluting organic titanium in ethanol was sprayed over a surface of the phosphor layer. Thereafter, the phosphor layer coated over the anode substrate was sintered at 500° C. After completion of the sintering, the anode substrate was mounted on a fluorescent display device to measure the characteristics of the phosphorescent material. The measurement revealed that the initial luminance was 90% of that obtained in Comparative Example 1 and a residual luminance after 500 hour life time test was 88%. This indicates that the phosphorescent material of this Example provided the same effect as those obtained in Examples 1 to 12 in which the phosphorescent material was used in the form of particles.

Moreover, although the anode voltage of 100 V was used in this Example to evaluate the characteristics of the phosphorescent material, the evaluation can be performed at a lower anode voltage, e.g. at 50 V or lower, by adding a conductive material such as $In_2O_3$ to the phosphorescent material.

As described above, since a phosphorescent material according to the present invention includes a phosphorescent body portion composed of alkali earth metal and an oxide, and a protective coat provided on a surface thereof, the phosphorescent material is effectively prevented from being adversely affected by especially carbon-based gases. As a result, there can be provided a phosphorescent material capable of emitting light even when a low voltage is applied thereto, and having an excellent life time characteristic. Moreover, the use of such a phosphorescent material eliminates a need of taking an expensive measure in which a vacuum degree of display devices such as a fluorescent display device must be raised to improve the life time characteristic. Accordingly, the present invention can provide inexpensive display devices.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and is desired by Letters Patent of the United States is:

1. A phosphorescent material comprising:

a body portion composed of an alkali earth metal and an oxide; and a protective coat formed over an outer surface of said body portion.

2. The phosphorescent material as defined in claim 1, wherein said protective coat is made of an oxide containing, as a primary component, at least one element selected from the group consisting of Al, Ti, Si, Zn, Sn, Bi, Sb, Ce, Y, Ta, Gd, Ru and Ga.

3. The phosphorescent material as defined in claim 2, wherein the amount of said protective coat is in the range of 50 mg to 10,000 mg based on one kilogram of said phosphorescent material.

4. The phosphorescent material as defined in claim 3, wherein said alkali earth metal is at least one element selected from the group consisting of Mg, Sr, Ca and Ba.

5. The phosphorescent material as defined in claim 4, wherein said oxide constituting the body portion is titanium oxide.

6. The phosphorescent material as defined in claim 5, wherein said body portion further contains an element belonging to III group of the Periodic Table.

7. The phosphorescent material as defined in claim 6, wherein said element belonging to III group of the Periodic Table is selected from the group consisting of Ce, Pr, Eu, Tb, Er and Tm in rare earth elements, and Al, Ga, In and Tl belonging to IIIb group of the Periodic Table.

* * * * *